TRAVELING WAVE ELECTRIC DISCHARGE OSCILLATOR WITH DIRECTIONAL COUPLING CONNECTIONS TO A TRAVELING WAVE STRUCTURE WHEREIN THE NUMBER OF COUPLING CONNECTIONS TIMES THE PHASE SHIFT BETWEEN ADJACENT CONNECTIONS EQUAL AN INTEGRAL NUMBER OF WAVELENGTHS

Filed March 24, 1961 3 Sheets-Sheet 1

INVENTOR:
HERBERT L. THAL, JR.
BY Philip J. Schlamp
HIS ATTORNEY.

INVENTOR:
HERBERT L. THAL, JR.
BY Philip L. Schlamp
HIS ATTORNEY.

Dec. 14, 1965 H. L. THAL, JR 3,223,882

TRAVELING WAVE ELECTRIC DISCHARGE OSCILLATOR WITH DIRECTIONAL COUPLING CONNECTIONS TO A TRAVELING WAVE STRUCTURE WHEREIN THE NUMBER OF COUPLING CONNECTIONS TIMES THE PHASE SHIFT BETWEEN ADJACENT CONNECTIONS EQUAL AN INTEGRAL NUMBER OF WAVELENGTHS

Filed March 24, 1961 3 Sheets-Sheet 3

INVENTOR
HERBERT L. THAL, JR.
BY Philip L. Schlamp
HIS ATTORNEY.

3,223,882

TRAVELING WAVE ELECTRIC DISCHARGE OSCILLATOR WITH DIRECTIONAL COUPLING CONNECTIONS TO A TRAVELING WAVE STRUCTURE WHEREIN THE NUMBER OF COUPLING CONNECTIONS TIMES THE PHASE SHIFT BETWEEN ADJACENT CONNECTIONS EQUAL AN INTEGRAL NUMBER OF WAVELENGTHS

Herbert L. Thal, Jr., Rotterdam, Schenectady, N.Y., assignor to General Electric Company, a corporation of New York Filed Mar. 24, 1961, Ser. No. 98,048
21 Claims. (Cl. 315—39.3)

My invention relates to crossed-field electric discharge devices and pertains more particularly to a new and improved traveling wave mode magnetron oscillator of the reentrant beam type and to new and improved traveling wave mode magnetron apparatus.

In traveling wave mode operation of reentrant beam magnetrons the electron beam generated by the device excites a traveling wave on the anode structure instead of the standing wave pattern that is ordinarily established in pi mode operation. At certain frequencies the electrical length of the anode is an integral number of wave lengths. At these frequencies a wave coupled onto the anode structure will be propagated therealong and will return to reinforce itself. When this condition prevails the anode structure is said to be resonant or to constitute a resonant loop.

In the prior art, magnetrons adapted for traveling wave mode operation have been employed with output circuit means usually comprising a transmission line disposed externally about the anode structure, an energy output port in the transmission line and directional coupling means interconnecting the anode structure of the magnetron and the transmission line. In such prior art devices energy is directionally coupled from the anode structure into the transmission line and toward the output port. However, I have found that in directionally coupled magnetron structures, and particularly where the directional coupling is to a high Q anode structure, any energy reflections on the anode structure are highly critical in that they can be magnified greatly by the resonance. Such magnification of reflections has the undesired effect of reducing substantially the power directivity of the directional coupling structure, or, in other words, the effectiveness of the structure in propagating energy preferentially in one direction. I have also found that when coupling to a high Q device the coupling connections between the directional coupler and the device can cause sufficient reflections to cause unsatisfactory operation in the sense that low power directivity of the directional coupler results.

In the prior art no means is provided for preventing or minimizing reflections on the anode structure and no recognition is evidenced of the fact that reflections resulting from the coupling interconnections between the transmission line of a directional coupler and an anode circuit can render the directional coupler ineffective for providing directional coupling to a high Q device with high power directivity.

According to an important feature of my invention, the coupling connections between the transmission line and anode structure constitute an apparent integral part of the anode structure at resonance and, thus, are essentially reflectionless elements in the anode structure. Thus, my structure is particularly adapted for providing directional coupling to a high Q resonant loop such as is found in a reentrant beam traveling wave mode magnetron.

Additionally, I have found that by providing a predetermined form of symmetrical coupling between a directional output coupler and a traveling wave mode magnetron and by extending such coupling completely about the device, traveling wave resonance can be readily obtained and that an unexpectedly high degree of power directivity is obtained. I have also found that in the absence of such symmetry the excitation of a high Q traveling wave resonance is almost impossible. Thus, according to a feature of my invention a predetermined form of symmetrical coupling between the directional coupler transmission line and the anode circuit is provided.

I have also found that with the mentioned predetermined symmetrical coupling between the transmission line of the directional coupler and anode circuit the structure is operable at resonance in a manner such that a wave introduced into the output circuit from an external source will excite a much larger traveling wave on the anode and that the phase and frequency of the anode wave can be readily controlled by controlling the frequency of the wave introduced into the output circuit. My invention contemplates utilizing this phenomenon in providing a new and improved structure wherein the directional coupler includes a pair of spaced energy transmission ports with one port adapted for energy output purposes and the other adapted for introducing controlling signals into the output circuit, thereby to vary predeterminedly the form of the traveling wave on the anode circuit. This feature of my invention adapts the device for use in apparatus effective, for example, for phase cohered operation locked oscillator operation, or intentional mode skipping operation in a radar system or the like.

The symmetrical coupling feature of my invention, and particularly the improved power directivity afforded thereby, in combination with the double-ported output circuit further adapts my invention for use in improved apparatus wherein the device serves as a self-duplexing oscillator. In this application the directional coupler includes a pair of spaced forward and reverse ports with the forward port being coupled to a load such as an antenna. The reverse port is coupled to receiving means. During oscillation the high degree of directivity afforded by my invention insures that virtually all of the generated power will flow out of the forward port to the load. When the oscillator is passive any reflected signal from, for example, a detected target is readily coupled back to the receiver through the interaction region of the magnetron and the reverse port. Thus, my invention contemplates the provision of magnetron structure which can obviate the need for separate duplexing devices or can, at least, greatly reduce the required power handling capacity of separate duplexers used therewith. Additionally, my improved structure is effective for simplifying the system and removing power handling or recovery time limitations which might be imposed on the system by conventional duplexers.

Still further, in many magnetron oscillator applications it is desirable that the magnetron be operated at a fixed frequency. However, magnetrons are generally known to be subject to frequency "pulling," or the tendency for the oscillatory frequency to vary in response to load variations. I have found that with the improved power directivity afforded by my invention I am able to provide an improved directionally coupled magnetron which is particularly stable and resistant to frequency "pulling," or unintentional mode skipping resulting from load variations.

Additionally, as indicated above, the improved power directivity of my device is effective in improving the transmission of any reflected energy from the load end of the output circuit back through the device and to the reverse end of the output coupler for transmission to receiving means. The improved power directivity of my invention also particularly adapts it for use in applications such as microwave heating where reflected energy can result from variations in load impedance due to differ ences in materials, sizes, positions and temperatures of the item being heated. In such applications the reflected energy is coupled back into the magnetron and toward the reverse end of the directional coupler for dissipation therein or for transmission through a reverse port for external dissipation. According to my invention the improved power directivity insures a non-synchronous relationship between the reflected energy and the forward traveling wave on the anode structure, thereby to avoid adverse effects on the propagation of the forward wave and also to insure that substantially all of the reflected energy will be coupled toward the reverse end of the output circuit.

Accordingly, a primary object of my invention is to provide a new and improved traveling wave mode crossed-field device.

Another object of my invention is to provide a new and improved directionally coupled traveling wave mode magnetron wherein the coupling means between the anode circuit of the device and the output circuit constitutes an essentially reflectionless structure.

Another object of my invention is to provide a new and improved directionally coupled traveling wave mode magnetron including improved means particularly adapted for effecting directional coupling to a high Q anode circuit.

Another object of my invention is to provide a new and improved directionally coupled traveling wave mode magnetron adapted for improved power directivity of the directionally coupled output circuit.

Another object of my invention is to provide a new and improved directionally coupled traveling wave mode magnetron including improved means increasing stability and resistance of the device to frequency "pulling" or unintentional mode skipping resulting from load variations.

Another object of my invention is to provide a new and improved traveling wave mode magnetron structure particularly adapted for phase cohered, locked oscillator and intentional mode skipping operation.

Another object of my invention is to provide a new and improved traveling wave mode magnetron structure particularly adapted for self-duplexing operation.

Another object of my invention is to provide a new and improved traveling wave mode magnetron particularly adapted for microwave heating applications.

Further objects and advantages of my invention will become apparent as the following description proceeds and the features of novelty which characterize my invention will be pointed out with particularity in the claims annexed to and forming a part of this specification.

In carrying out the objects of my invention I provide a magnetron device including a periodic slow wave anode structure wrapped about a coaxial cathode and cooperating therewith to define an interaction space. Concentric with the anode structure is a transmission line which is directionally coupled to the anode structure in accordance with a predetermined symmetry which preferably involves equally spaced coupling interconnections between periodic sections of the anode structure and the transmission line. Alternatively, the equally spaced coupling connections can be in an amount which is a sub-multiple of the total number of periodic sections in the anode structure, provided the positional relation between the coupling connections and periodic sections is such that at desired operating resonant frequencies the total phase shift on the anode structure between immediately adjacent coupling connections is other than an integral number of electrical half wave lengths. The transmission line can comprise either a coaxial line or a wave guide and the coupling connections can comprise slots interconnecting the several anode sections and transmission line in the described predetermined symmetrical arrangement.

The transmission line can include electrically separated energy transmission ports at opposite ends thereof.

In operation as a signal-controlled oscillator, the forward port in relation to the directivity of the directional coupling structure and beam rotation is connected to a load while the reverse port can be connected to a control signal source. In operation as a self-duplexing device, the forward port is coupled to an antenna and the reverse port is coupled to appropriate receiving means. In operation as a microwave heating oscillator the forward port is connected to a load such as a resonant cavity for receiving items to be heated and the reverse port is connected to a dissipative load. Alternatively, the dissipative load can be located internally of the transmission line structure.

For a better understanding of my invention reference may be had to the accompanying drawing in which.

Figures 1, 3:
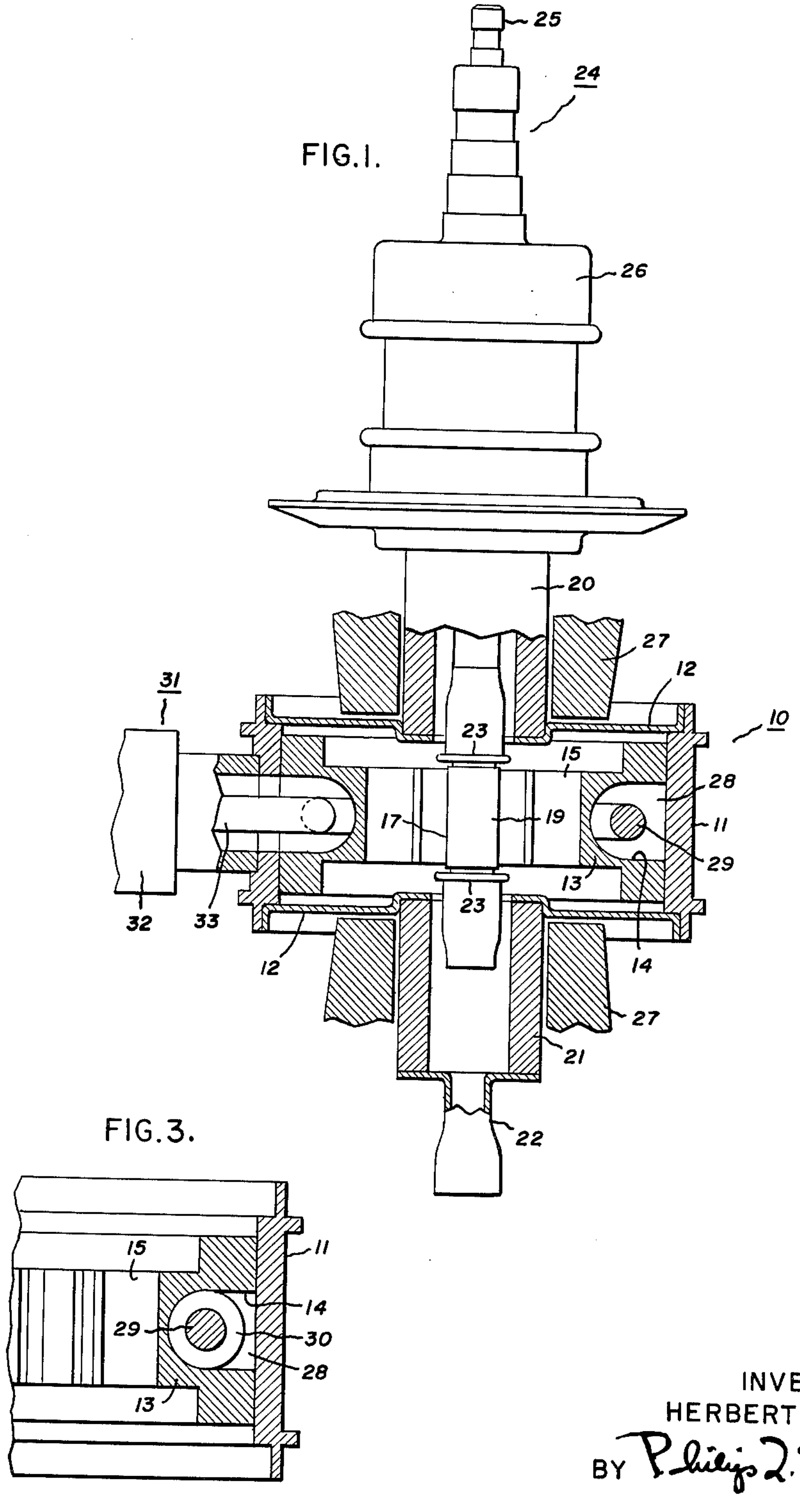
FIGURE 1 is a partially sectionalized elevational view of an embodiment of my invention.
FIGURE 3 is an enlarged fragmentary sectional view taken along the lines 3—3 in FIGURE 2.
Figures 2, 4:
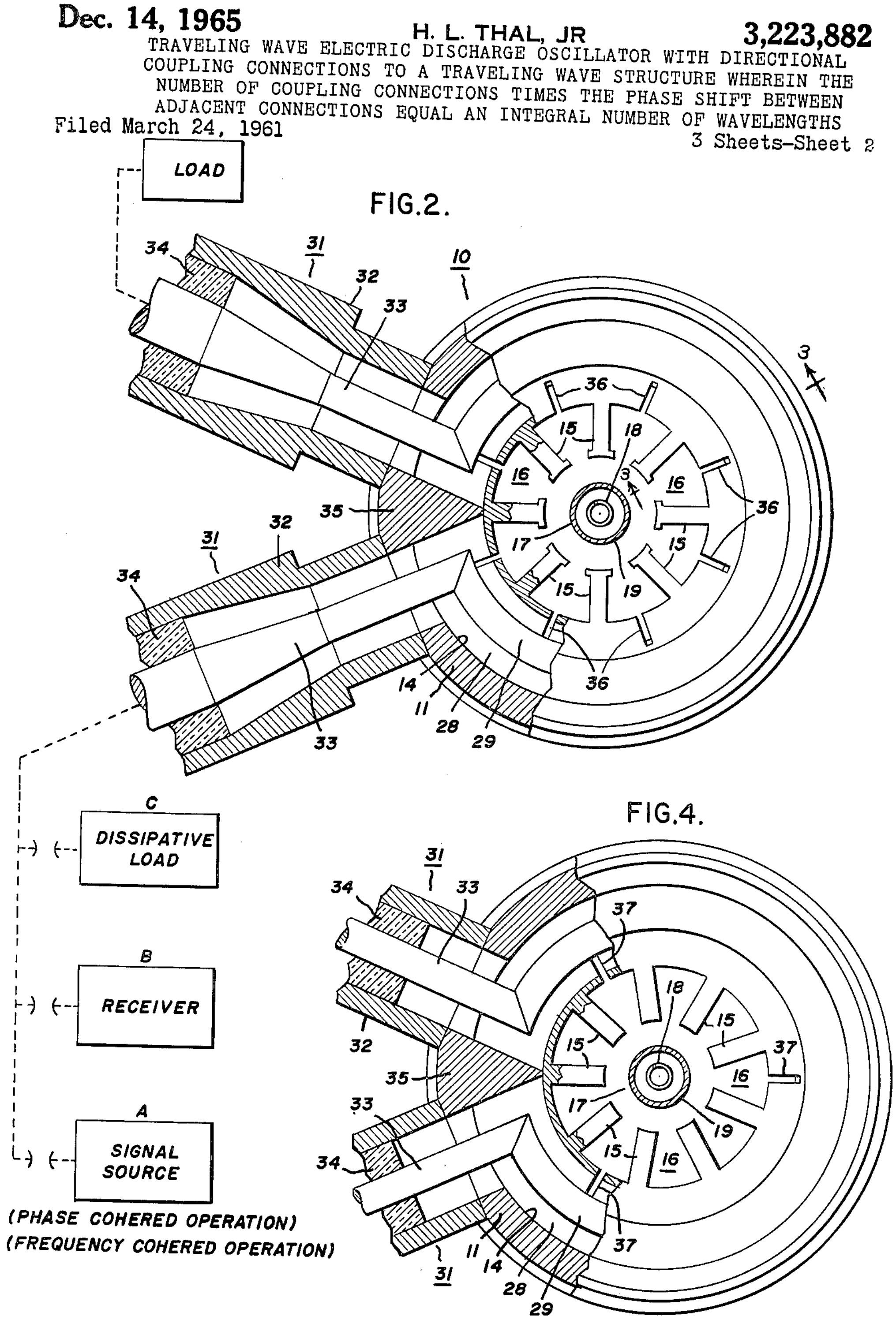
FIGURE 2 is an enlarged fragmentary and partially sectionalized view which illustrates particular features of the magnetron device of FIGURE 1 and further illustrates schematically alternative forms of apparatus wherein the magnetron device of my invention is employable.
FIGURE 4 is an enlarged fragmentary sectional view illustrating a modified form of my invention.

Referring to the drawing, I have shown in FIGURES 1 to 3 a form of my invention comprising a traveling wave mode magnetron structure with a directionally coupled coaxial transmission line output circuit. The illustrated structure comprises an evacuated enclosure or envelope generally designated 10. More specifically, the envelope 10 includes a cylindrical wall member 11 having hermetically sealed to the opposite ends thereof metal end caps 12. The wall member 11 can advantageously be formed of a high heat conductivity material such as copper and the end caps are preferably formed of a material such as steel. Supported on the inner surface of the wall member 11 is a member 13 formed to include an annular recess 14 in the outer surface thereof. Additionally, the member 13 is formed to include a plurality of radially extending segments or vanes 15. As perhaps best seen in FIGURE 2, the vanes 15 define a plurality of resonant cavities 16. Additionally, the innermost ends of the vanes 15 define a coaxial opening or central space in which is located a coaxial cathode structure generally designated 17. The cathode structure 17 comprises a filamentary heater 18 surrounded by a cylindrical cathode sleeve 19 adapted for being rendered emissive upon energization of the heater. In this arrangement the anode structure including the resonant cavities 16 constitutes a slow wave circuit and the anode structure and cathode structure cooperate to provide an annular interaction space.

As seen in FIGURE 1, the envelope 10 further includes upper and lower magnetic material cylinders 20 and 21, respectively, which have the opposed ends thereof suitably hermetically sealed to the rims of apertures formed centrally in the corresponding end caps 12. The outer end of the lower cylinder 21 has sealed thereto an exhaust tubulation element 22 which is adapted for being pinched off at the end thereof in the manner shown and, thereby, sealed following exhaust of the envelope.

In the embodiment illustrated the above-mentioned cathode sleeve 19 is included in a cathode mount structure which includes portions extending partially into the cylinders 20 and 21 and which carry end hats 23 spaced longitudinally outwardly of the emissive sleeve 19. Electrical connections to the cathode heater and sleeve are made through the contact structure generally designated 24 in FIGURE 1 and sealed to the outer end of the cylinder 20. The structure 24 includes a heater contact 25 and a cathode contact 26. The cathode contact 26 also serves as a second heater contact. In a suitable manner not shown these contacts are appropriately electrically connected to the leads of the heater 18 and to the cathode sleeve 19. Fitted about the cylinders 20 and 21 are external magnetic pole pieces 27 adapted for establishing a magnetic field extending coaxially through the above-mentioned interaction space defined by the cathode and anode vane tips and thus perpendicular to a D.C. electric field established between the anode and cathode by a D.C. source not shown. The pole pieces 27 can be the poles of a permanent magnet or can comprise elements in an electromagnetic structure.

The magnetic field in the interaction space adapts the structure for magnetron operation in the usual manner. That is, the device is adapted for operating according to the classical theory of magnetron operation wherein an electron beam is caused to rotate about the cathode in spoke-like bunches for exciting the cavities 16 and thus generating radio frequency power. In most cases magnetron devices are adapted for being operated and excited in the pi mode or that mode in which the induced voltage on adjacent vanes alternate 180 degrees out of phase and in accordance with a standing wave pattern. In contrast, the presently disclosed structure is adapted for magnetron operation in a directional or traveling wave mode. That is, the device is constructed such that the rotating beam is effective for exciting a traveling wave on the anode structure instead of a straight standing wave or non-directional pattern. The mentioned traveling wave is established, of course, at only certain predetermined oscillatory frequencies at which the electrical length of the anode circuit, or slow wave structure, is an intergal number of wave lengths. At these predetermined frequencies a wave coupled onto the anode structure will be propagated therealong and will return to reinforce itself. When this condition obtains the anode structure is said to be resonant or to constitute a resonant loop. An important object of my invention is to provide both maximum power output from the mentioned anode circuit at predetermined resonant operation frequencies and to provide for practical directional coupling to a high Q anode circuit at such frequencies and to these ends I have provided improved output means, now to be described in detail.

My improved output means includes a transmission line generally designated 28 which is shown in FIGURES 1 to 3 and which completely surrounds the above described anode structure. The transmission line illustrated in FIGURES 1 to 3 constitutes a coaxial line the outer conductor of which is defined by the inner surface of the annular recess 14 in the anode member 13. It is to be understood from the outset that while the disclosed form of structure for providing the surrounding coaxial line is effective in attaining the advantages of my invention and provides certain advantages from the manufacturing standpoint, my invention is not to be limited to the disclosed form of structure but is equally applicable to other forms of arrangements wherein the transmission line is arranged concentric with the anode structure. For example, a coaxial line wrapped about the exterior of the cylinder 11 is equally employable to obtain many of the advantages of my invention provided the above-referenced symmetrical coupling can be provided thereto. By way of further example, a transmission line arranged concentrically within the tube envelope in an end space between the anode structure and an end cap is employable.

The inner conductor of the coaxial line shown in FIGURES 1 to 3 comprises a conductive ring-like member 29 periodically supported concentrically in the recess 14 by a plurality of circumferentially spaced annular insulators of the type shown and designated 30 in FIGURE 3. The insulators 30 are inserted snugly in the recess 14 and are adapted for radio freqeuncy energy transmission therethrough with negligible attenuation. The ends of the center conductor 29 extend radially from the device through coaxial energy transmission ports or couplers generally designated 31. As seen in FIGURE 2 the couplers 31 each comprise a cylindrical outer conductor 32, an extension 33 of the coaxial line center conductor 29 and appropriate sealing means 34 adapted for hermetically sealing the conductors in coaxial relation without subtracting from the radio frequency requirements of the couplers. Depending upon the direction of the propagation of the traveling wave on the anode circuit, which depends on the direction of the operating magnetic field extending through the device, one of the coaxial couplers 31 can for some applications be considered as a forward output port and the other as a reverse port.

As seen in FIGURE 2, the ends of the coaxial line are electrically separated by conductive element 35 which extends radially inwardly to the conductive wall portion which separates the transmission line from the resonator cavities in the anode structure. The element 35 electrically isolates the ends of the transmission line in a predetermined manner which will be described in greater detail hereinafter.

I found that the key to obtaining the optimum directional mode operation, or operation providing a high degree of power directivity toward the output port of a directionally coupled traveling wave mode magnetron, is in achieving an anode structure and output transmission line combination that is particularly effective in supporting a traveling wave resonance. Additionally, I have found that such resonance can be readily obtained by providing a predetermined symmetry between a plurality of coupling connections and the anode circuit and that without such symmetry the excitation of a high Q traveling wave resonance is practically impossible.

Specifically, and in accordance with my invention, the transmission line 28 and anode circuit are electromagnetically coupled in a symmetrical, or periodic, manner in which the coupling connections constitute apparent integral parts of the anode structure at resonance and whereby the connections are adapted for being essentially reflectionless elements in the anode structure. As seen in FIGURE 2, the transmission line 28 and anode circuit are interconnected by a plurality of coupling slots 36. According to my invention coupling connections provided by the slots 36 are equally spaced completely about the device with a predetermined relationship existing between the phase shift between coupling slots on the output line to the phase shift of the anode structure.

In the embodiment illustrated in FIGURES 1 to 3, a slot 36 interconnects each of the resonant cavities 16 with the transmission line. In this embodiment each cavity constitutes a periodic section of a periodic slow wave anode structure and each slot 36 yields non-directional coupling to the output line. The desired directional coupling is obtained by matching the phase shift between coupling slots on the output line to the phase shift of the anode structure. More specifically, when the number of slots times the phase shift between adjacent slots equals an integral number of wave lengths the directivity is substantially perfect for small, uniformly spaced slots and it is possible to couple directionally all modes except the pi and zero modes. Thus, the entire slow wave anode circuit is part of the directional coupler and the slots result in essentially no reflections on the reentrant loop, in which the traveling wave is being propagated.

In order to bring out fully the advantages resulting from my improved substantially reflectionless structure it will be helpful to discuss briefly the effects of reflections on a resonant loop such as that defined by the anode circuit and cathode in the above-described device. First, a uniform, lossless transmission line in the form of a reentrant loop has resonances at frequencies where the total electrical length of the loop is an integral number of wave lengths. As long as the circuit is reflectionless, a degeneracy exists, and there are two orthogonal resonant modes at exactly the same frequency. These are generally termed doublet resonances and may be taken as a pair of oppositely directed traveling waves or a pair of standing waves 90 degrees out of spatial phase. In the lossless loop with no external coupling, the presence of even an infinitesimal reflection removes the degeneracy, or creates a split in the resonant frequencies of the two standing wave modes. Furthermore, the traveling wave solutions are destroyed inasmuch as the reflection would have the same effect on a traveling wave as an infinite number of identical obstacles, separated by an integral number of wave lengths in a continuous length transmission line. However, I have found that if the transmission line loop has three or more identical, equally-spaced obstacles, the degeneracy will again exist provided the obstacles are not separated by an integral number of half wave lengths. This property is utilized according to my invention to attain the above-referenced essentially reflectionless coupling to the anode circuit and the operational advantages accruing therefrom.

More specifically, in my invention the anode structure defines a resonant loop and by locating the coupling slots in each cavity and so as to be equally spaced completely about the anode circuit I have provided a structure wherein the loop has at least three identical, equally-spaced obstacles. These obstacles are not separated by an integral number of half wave lengths and thus a degeneracy is provided which allows identical coupling to both of the aforementioned doublet resonances. This provides for high directivity in the directional mode operation even when the loaded Q is high.

Additionally, my invention, by affording practical directional coupling in a traveling wave magnetron, enables me to operate the device in virtually any mode other than the pi and zero modes. This provides a much wider choice of operating parameters, such as, number of vanes, and mode separation, and, thus, makes possible use of certain structures which heretofore were generally considered inapplicable for certain modes of magnetron operation. For example, the device illustrated in FIGURES 1 and 2 when operated in the 270 degree mode provides for considerably better mode separation than a conventional unstrapped magnetron of comparable electrical length operating in pi mode. Also, this particular embodiment of the disclosed device requires only two-thirds the number of anode segments of a pi mode device of the same electrical length. This enables the use of physically larger and more rugged segments for a given construction. Also, it can result in manufacturing economies.

While I have described and illustrated to this point a structure including coupling slots in each of the resonant cavities of the magnetron, it is to be understood from the foregoing that this particular form of coupling is not essential to the operation of my invention. The advantages of my invention are obtainable with a lesser number of coupling connections, provided the above-mentioned relationship between the coupling connections and the phase shift on the anode circuit is maintained. More specifically, the advantages of my invention are obtainable so long as the coupling connections between a periodic anode circuit and a concentric transmission line are equally spaced completely about the anode circuit, are in an amount which is a sub-multiple of the total number of periodic sections of the anode circuit and the positional relation of the coupling connections and periodic sections is such that the total phase shift on the anode circit between the immediately adjacent coupling connections is other than an integral number of half wave lengths at the desired operating frequencies. Another form of device which is adapted to satisfy this relationship is illustrated in FIGURE 4. The device of FIGURE 4 can be identical in all respects to that illustrated in FIGURES 1 and 3, including insulative supports (not shown) for holding the center conductor concentric in the outer conductor of the coaxial transmission line, except for the provision of only three coupling connections or slots designated 37. The slots 37 are symmetrically or equally spaced completely about the anode circuit, which in the illustrated case includes nine resonator cavities 16. Thus, the number of slots 37 is a sub-multiple of the number of resonator cavities and the positional relation of the slots and cavities is such that at operating resonance the total phase shift on the anode between adjacent slots 37 is not an integral number of half wave lengths. Expressed in another manner, the coupling connections are made to every $n$th anode cavity, or periodic anode section, where the number of such cavities, or periodic sections, is an integral multiple of $n$ and the positional relation of the coupling connections and cavities is such that at operating resonance the phase shift per cavity times $n$ is not an integral number of half wave lengths.

In the structure of FIGURE 4 only those cavities in which the coupling connections are located are integral parts of the directional coupler connection. However, due to the periodic or symmetrical arrangement of these connections, no undesired reflections result in those modes for which the coupling loops are not separated by an integral number of half wave lengths, such, for example, as those models in which the phase shift per cavity is 40°, 80° and 160° and their space harmonics. Expressed in another manner, the 120° mode is unacceptable. Thus, the structure of FIGURE 4 is adapted for practical high directivity coupling to a high Q resonant loop for the mentioned 40°, 80° and 160° modes and their space harmonics.

As pointed out above, the ends of the transmission line about the anode structure are electrically separated by a baffle element 35 in the device of FIGURES 1 to 3. An identical element is provided in the structure of FIGURE 4. The baffle element 35 in both forms of device extend radially inwardly to a point midway intermediate an adjacent pair of coupling connections. This disposition of the baffling element avoids adverse effects on the above-discussed high directivity of the directional coupling arrangement.

Figure 5:
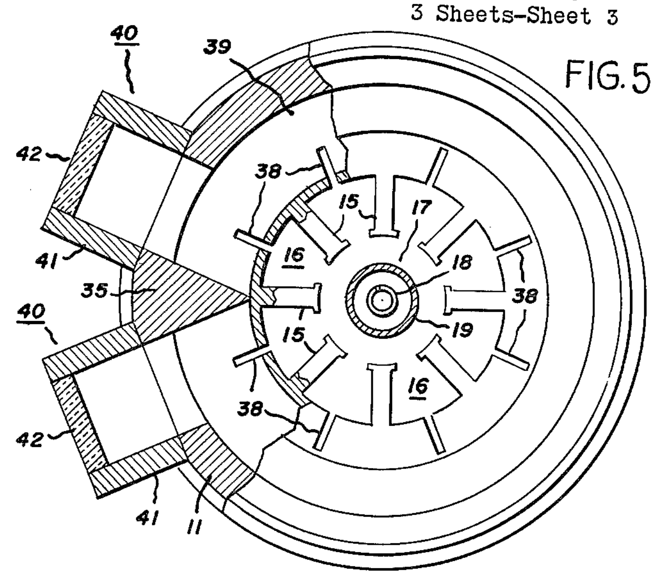
FIGURE 5 is an enlarged fragmentary and partially sectionalized view of another modified form of my invention.
Figure 6:
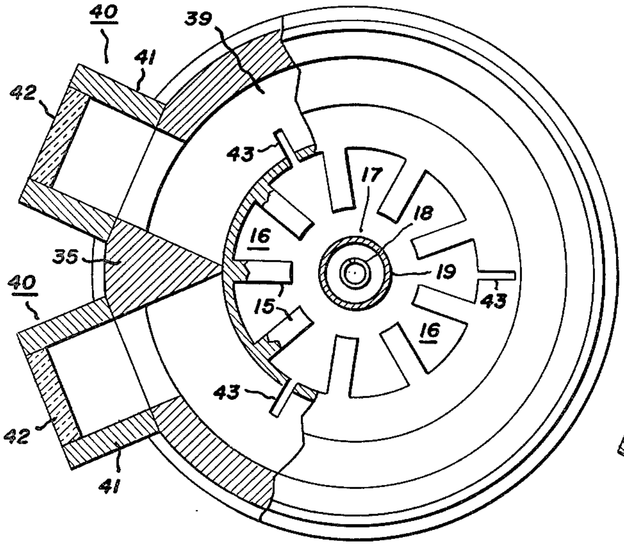
FIGURE 6 is an enlarged sectional view of another modified form of my invention.

As illustrated in FIGURES 5 and 6, my invention is not limited to the use of a coaxial line as the output transmission line. A wave guide is equally employable as the output transmission line. As seen in FIGURE 5, the advantages of my invention can be obtained with a device constructed to include a cathode and anode circuit identical to those employed in the device of FIGURES 1 to 3. Additionally, the back wall of each of the cavities can be constructed to include a coupling connection in the form, for example, of a slot 38. The slots 38 are located to provide the symmetrical coupling discussed above and, thus, are adapted for directionally coupling a traveling wave on the anode circuit to a wave guide 39 wrapped completely about the anode circuit. The wave guide is constructed to include a pair of output couplers 40 which are located at opposite ends of the wave guide and are electrically separated by a conductive baffling element 35 extending radially inwardly to a point midway between an adjacent pair of slots 38. In this structure the mentioned output ports can comprise conventional waveguide window arrangements which usually include a radially protruding waveguide section 41 closed by a hermetically sealed transverse waveguide section 42.

The device illustrated in FIGURE 6 can be identical to that of FIGURE 5 except for provision of a lesser number of periodic coupling connections 43 between the anode circuit and waveguide. In this structure the number of coupling connections and positional relation between such connections and the phase shift on the anode circuit are identical structurally and functionally to those described above with respect to the device shown in FIGURE 4. Thus, the device of FIGURE 6 is preferably identical in structure and function to that of FIGURE 4 except for the use of a wave guide instead of a coaxial line in the output circuit.

It is to be understood from the foregoing that my invention in its broad aspects is not limited to the particular forms of anode structure, transmission lines and coupling connections shown. For example, the anode structure can be any form of periodic slow wave structure adapted for supporting a traveling wave, including, but not limited to, interdigital and slotted wall anode structures. Also, as indicated above, the output transmission line can take other forms. For example, it can comprise a split-ring element supported in an end space and cooperating with an envelope wall surface to define a wave-guiding line. Further, the coupling connections need not comprise slots but can comprise inductive loops, probes and conductive pins, for example.

As indicated above, my invention, including any of the several various forms illustrated in FIGURES 1 to 6, is adapted for use in applications or systems affording operational advantages not heretofore attainable. Illustrated in FIGURE 2 are several alternate forms of such apparatus. It is to be understood that each alternative form of apparatus is operable with any of the magnetron devices illustrated in FIGURES 1 to 6. Additionally, while these applications are alternative I have, in order to simplify illustration, shown in FIGURE 2 several different manners of combining my improved crossed field device with system components including load elements and other elements. However, it is to be understood that each of the systems about to be described is intended to include a load, coupled to one port of the magnetron device, and only one of the several illustrated components that may be coupled to the other port of the device. Additionally, to facilitate explanation I have limited description of the mentioned several alternative applications to the particular tube illustrated in FIGURE 2 although, as indicated above, any one of the several forms of magnetron devices illustrated in FIGURES 1 to 6 may be employable in the systems to be described.

One of the mentioned applications comprises a directionally-coupled traveling wave mode magnetron of the type described above, a load circuit coupled to the forward port of the tube output circuit and an appropriate signal source coupled to the opposite output port. The signal source designated A in FIGURE 2 can be any well-known generally available means for providing a controlled low level signal and for introducing same into the tube through the reverse port. With such means it is possible to control the phase of the oscillation of the tube. Thus, it is possible to provide what is referred to in the art as "phase cohered" operation in respect to the traveling wave coupled to the anode circuit and abstracted by the directional coupler for being propagated through the forward port to the load, which in this case can constitute a radar antenna.

The just-described apparatus can also be employed to provide what is termed in the art as "frequency cohered" operation. In this form of operation the signal source is adapted for introducing a signal into the device through the reverse port for affecting the frequency of the generated wave on the anode circuit and fed to the load. This form of apparatus is also operative for enabling "mode skipping" operation or the intentional change of the operation from one mode of operation to another. It is to be understood, however, that my device is not limited to mode skipping operation controlled in this manner. Alternatively, mode skipping is obtainable with my device by, for example, varying anode voltage.

My improved tube structures are also equally adapted for serving as self-duplexing oscillators. As seen in FIGURE 2, a tube constructed according to my invention can have a load such as an antenna coupled to the forward port and receiving means designated B coupled to the reverse port. The receiving means can comprise any suitable form of equipment of the type generally employed in the art for radar reception. In this arrangement and during oscillation of the tube, generated power flows out the forward port toward the load and substantially none flows out of the reverse port due to the above-discussed high power directivity of my device. When the tube is passive, or not oscillating, any reflected or return signal from the load, or antenna, is coupled back through the tube and through the reverse port to the receiver. This arrangement can either eliminate the necessity for separate duplexers or can, at least, greatly reduce the power handling capacity of any duplexers that may be employed. Additionally, it can simplify the system and remove any power handling or recovery time limitations which may be imposed on the system by conventional duplexers.

As also illustrated in FIGURE 2, my improved structure is adapted for providing improved apparatus wherein reflections from a load can be dissipated without adversely affecting the power generated and fed to the load. More specifically, the forward port can be coupled to a load, such for example, as a resonant cavity serving as a microwave oven used for microwave heating of edibles or other items. In this system the reverse port is coupled to a matched dissipative load designated C. During operation any reflected energy resulting from a mismatch in a load caused by a variation in load impedance such as can be caused by differences in material, size or temperatures of items in the oven, are coupled back into the tube through the forward port. In the tube, the reflected power is non-synchronous with respect to the forward traveling wave and, thus, travels around the reentrant loop and is directionally coupled toward the reverse port without affecting the frequency of oscillation. The reverse port can be coupled to an appropriately matched load effective for dissipating the energy of the reflected waves therein. Thus, in this directional operation the magnetron behaves as an ideal matched generator. The insensitivity of the operation of the magnetron to variations in load impedance also minimizes any tendency toward undesired cathode back-heating and output power variations.

Figure 7:
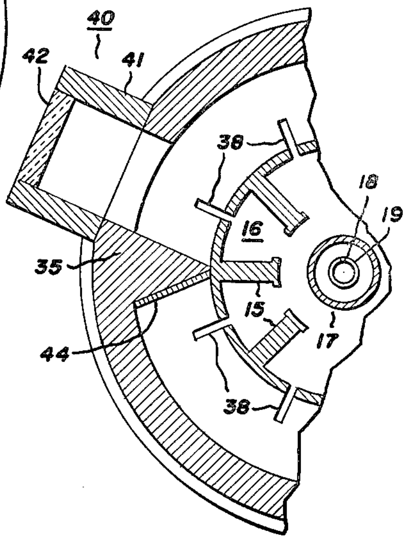
FIGURE 7 is an enlarged fragmentary sectionalized view of still another modified form of my invention.

If desired, the dissipative load at the reverse termination of the output circuit can be internal of the tube. One form of such structure is illustrated in FIGURE 7. The device of FIGURE 7 can be substantially identical to that of either FIGURE 5 or FIGURE 6 except that no reverse port structure is employed. Instead, power-dissipating means such as a coating 44 of high electrical resistance material is provided in the transmission line at the terminal portion thereof. The material 44 serves to attenuate any reflected energy propagated theretoward.

While I have shown the structure of FIGURE 7 as including a wave guide transmission line and a dissipative load in the form of a resistance coating, it is to be understood from the foregoing that the transmission line can assume another form, such as a coaxial line. Also, the dissipative load means can assume any of a number of various well-known attenuation structures.

It is also to be appreciated from the foregoing that in all of the described applications of my improved tube the symmetrical coupling is essential to satisfactory operation in view of the fact that without the described symmetry of coupling the excitation of a high Q traveling wave resonance is practically impossible and without such resonance the described types of operation are unattainable. It is to be understood further that the mentioned symmetrical coupling affords the desired high degree of efficiency and power directivity which make the described type of device particularly attractive in the mentioned forms of apparatus. By way of example of efficiency and power directivity capabilities of my invention, I have been able to operate tubes constructed in accordance with my invention with peak power outputs over one half a megawatt, efficiencies of 50% and power directivities exceeding 75 to 1. Additionally, by way of example of the stability of devices constructed in accordance with my invention, or in other words, the resistance of such devices to frequency "pulling," I have operated such devices at frequencies of 2500 megacycles into all phases of a short-circuited load with an exhibited pulling figure of only 2 megacycles. This ability or resistance to pulling also serves to minimize output power variations.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. An electric discharge oscillator device comprising a cathode, a periodic slow wave high Q anode structure surrounding said cathode, said cathode and anode structure defining a reentrant slow wave structure effective for supporting a desired traveling wave mode of oscillation at particular operating frequencies, only a single transmission line concentric with said anode structure and including an output coupling port at one end and reverse terminating means at the opposite end thereof, directional coupling means comprising a plurality of coupling connections symmetrically equally spaced completely about said anode structure and connecting each periodic section thereof with said transmission line for directionally coupling energy toward only said output coupling port in said transmission line, the number of coupling connections times the phase shift between adjacent coupling connections being equal to an integral number of wavelengths, and means in said transmission line electrically separating said output port and reverse terminating means intermediate an adjacent pair of coupling connections.

2. An electric discharge oscillator device comprising a cathode, a periodic slow wave high Q anode structure surrounding said cathode, said cathode and anode structure defining a reentrant slow wave structure effective for supporting a desired traveling wave mode of oscillation at particuar operating frequencies, only a single transmission line concentric with said anode structure and including an output coupling port at one end and reverse terminating means at the opposite end thereof, means electrically separating said port and said reverse termination means, directional coupling means comprising a plurality of coupling connections equally spaced symmetrically completely about said anode structure and connecting each periodic section thereof with said transmission line for directionally coupling energy toward only said output coupling port in said transmission line, means in said transmission line electrically separating said output port and reverse terminating means intermediate an adjacent pair of coupling connections, and said reverse terminating means including means effective for dissipating energy propagated theretoward, the number of coupling connections times the phase shift between adjacent coupling connections being equal to an integral number of wavelengths, said port means and said reverse terminating means having substantially uniform impedance channels leading into and out of said device.

3. An electric discharge oscillator device comprising a cathode, a periodic slow wave high Q anode structure surrounding said cathode, said cathode and anode structure defining a reentrant slow wave structure effective for supporting a desired traveling wave mode of oscillation at a predetermined resonant operating frequency, a transmission line concentric with said anode structure and including an output port at one end and reverse terminating means at the opposite end thereof, means electrically separating said port and said reverse termination means, and directional coupling means between said device and transmission line effective for directionally coupling energy toward only said output port, said directional coupling means comprising a plurality of coupling connections between said transmission line and periodic sections of said slow wave structure, said coupling connections being equally spaced completely about said slow wave structure and in an amount which is a sub-multiple of the total number of periodic sections of said slow wave structure, and the positional relation of said coupling connections and periodic sections being such that the total phase shift on said slow wave structure between immediately adjacent coupling connections is other than an integral number of half wave lengths at said operating frequency.

4. An electric discharge oscillator device comprising a cathode, a periodic slow wave high Q anode structure surrounding said cathode, said cathode and anode structure defining a reentrant slow wave structure effective for supporting a desired traveling wave mode of oscillation at a predetermined resonant operating frequency, a transmission line concentric with said anode structure and including an output port at one end and reverse terminating means at the opposite end thereof, and directional coupling means between said device and transmission line and effective for directionally coupling energy toward only said output port, said directional coupling means comprising a plurality of coupling connections between said transmission line and periodic sections of said slow wave structure, said coupling connections being in every $n$th periodic section, the number of said periodic sections being an integral multiple of $n$, the number of coupling connections times the phase shift between adjacent coupling connections being equal to an integral number of wavelengths, and the positional relation of said coupling connections and said periodic sections being such that at said operating frequency the phase shift per cavity times $n$ is other than an integral number of half wave lengths.

5. An electric discharge oscillator device comprising a cathode, a periodic slow wave high Q anode structure including a plurality of resonator cavities surrounding said cathode, defining a reentrant slow wave structure effective for supporting a traveling wave mode of oscillation at a desired resonant operating frequency at which the electrical length of said anode structure is an integral number of wave lengths, a single transmission line concentric with said anode structure and including a pair of energy transmission ports at opposite and electrically separate ends of said line, and directional coupling means between said anode structure and transmission line, said directional coupling means comprising a plurality of coupling connections between said transmission lines and said cavities in said slow wave anode structure, said coupling connections being equally spaced and in an amount which is a sub-multiple of the total number of cavities in said slow wave structure, and the positional relation of said coupling connections and cavities being such that the total phase shift on said slow wave structure between immediately adjacent coupling connections is other than an integral number of half wave lengths at said operating frequency.

6. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency, a coaxial line surrounding said anode structure and including output coupling means at one end and reverse terminating means at the opposite end thereof, and directional coupling means between said anode structure and coaxial line effective for directionally coupling energy from said slow wave structure toward only said output coupling means in said coaxial line, said directional coupling means comprising a plurality of coupling aperture connections between said coaxial line and said cavities in said anode structure, said coupling connections being equally spaced completely about such anode structure and in an amount which is a sub-multiple of the total number of cavities in said slow wave structure, and the positional relation of said connections and said cavities being such that the total phase shift on said slow wave structure between immediately adjacent connections is other than an integral number of half wave lengths at said operating frequency.

7. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency at which the electrical length of said anode structure is an integral number of wave lengths, a coaxial line surrounding said anode structure and including an output port at one end and reverse terminating means at the opposite end thereof, and directional coupling means between said anode structure and coaxial line effective for directionally coupling energy from said slow wave structure toward only said output port in said coaxial line, said directional coupling means comprising a plurality of small equally spaced coupling slots defined by a wall of said cavities and interconnecting each said cavities and said coaxial line through a wall of said coaxial line, each of said slots interconnecting a single cavity with said line, the number of coupling slots times the phase shift between adjacent coupling slots being equal to an integral number of wavelengths.

8. An electric discharge oscillator device comprising a cathode, an anode member surrounding said cathode, said anode member comprising a metallic annular portion defining a reentrant periodic slow wave high Q anode structure on the inner side thereof, the outer surface of said annular portion including an annular recess, a conductive wall member fitted tightly about said annular portion and cooperating with said annular recess therein to define the outer conductor of a coaxial line, an inner conductor concentrically supported in said outer conductor, output coupling means at one end and reverse terminating means at the opposite end of said coaxial line, and means comprising a plurality of symmetrically arranged equally spaced coupling connections between said line and periodic sections of said anode structure effective for directionally coupling energy from said anode structure toward only said output coupling means, the number of coupling connections times the phase shift between adjacent coupling connections being equal to an integral number of wavelengths.

9. An electric discharge oscillator device comprising a cathode, a periodic slow wage high Q anode structure, said cathode and said anode structure defining a reentrant slow wave structure effective for supporting a traveling wave mode of oscillation at a desired resonant operating frequency, only a single wave guide surrounding said anode structure and including an output port at one end and reverse terminating means at the opposite end thereof, and directional coupling means between said anode structure and wave guide effective for directionally coupling energy from said slow wave structure toward only said output port in said wave guide, said directionally coupling means comprising a plurality of symmetrically equally spaced coupling connections totally surrounding said anode structure coupling periodic sections of said anode structure to said wave guide, the number of coupling connections times the phase shift between adjacent coupling connections being equal to an integral number of wavelengths.

10. An electric discharge oscillator device comprising a cathode, a periodic slow wave high Q anode structure including a plurality of resonator cavities surrounding said cathode, said cathode and said anode structure defining a reentrant slow wave structure effective for supporting a traveling wave mode of oscillation at a desired resonant operating frequency, only a single wave guide wrapped about said anode structure and including a pair of energy transmission ports at opposite ends thereof, directional coupling means between said anode structure and wave guide effective for directionally coupling energy from said slow wave structure toward only one of said ports in said wave guide, said directional coupling means comprising a plurality of symmetrically equally spaced coupling connections coupling each said cavities to said wave guide, and means in said wave guide electrically separating said energy transmission ports at a point intermediate an adjacent pair of said coupling connections, the number of coupling connections times the phase shift between adjacent coupling connections being equal to an integral number of wavelengths.

11. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency, only a single wave guide surrounding said anode structure and including output coupling means at one end and reverse terminating means at the opposite end thereof, and directional coupling means between said anode structure and wave guide effective for directionally coupling energy from said slow wave structure toward only said output coupling means, said directional coupling means comprising a plurality of coupling connections between said wave guide and said cavities in said anode structure, said coupling connections being equally spaced completely about said anode structure and in an amount which is a sub-multiple of the total number of cavities in said slow wave structure, and the positional relation of said connections and cavities being such that the total phase shift on said slow wave structure between immediately adjacent connections is other than an integral number of half wave lengths at said operating frequency.

12. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency, only a single wave guide surrounding said anode structure and including an output port at one end and reverse terminating means at the opposite end thereof, and directional coupling means between said anode structure and wave guide effective for directionally coupling energy from said slow wave structure toward only said output port in said wave guide, said directional coupling means comprising a plurality of spaced small coupling slots of a size effective to retain said high Q and interconnecting each said cavities and said wave guide, the number of coupling slots times the phase shift between adjacent slots being equal to an integral number of wavelengths.

13. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency, only a single wave guide surrounding said anode structure and including an output port and reverse terminating means at opposite ends thereof, and directional coupling means beteween said anode structure and wave guide effective for directionally coupling energy from said slow wave structure toward only said output port in said wave guide, said directional coupling means comprising a plurality of coupling slots interconnecting cavities in said slow wave structure and said wave guide at equally spaced points about said anode structure, said slot having dimensions effective to retain said high Q condition and the positional relation of said slots and cavities being such that the total phase shift on said slow wave structure between immediately adjacent slots is other than an integral number of half wave lengths at said operating frequency.

14. An electric discharge oscillator device comprising a cathode, a periodic slow wave high Q anode structure including a plurality of resonator cavities surrounding said cathode, said cathode and anode structure defining a reentrant slow wave structure effective for supporting a traveling wave mode of oscillation at a desired resonant operating frequency, only a single wave guide wrapped about said anode structure and including forward and reverse energy transmission ports at opposite ends thereof, directional coupling means between said anode structure and wave guide effective for directionally coupling energy from said slow wave structure toward only the forward port in said wave guide, said directional coupling means comprising a plurality of symmetrically peripherally equally spaced small coupling slots interconnecting each said cavities and said wave guide, said slots being of a size effective to retain said high Q condition, and means in said wave guide electrically separating said forward and reverse ports at a point intermediate an adjacent pair of said coupling slots and along a wall common to adjacent cavities, the number of coupling slots times the phase shift between adjacent coupling slots being equal to an integral number of wavelengths.

15. An electric discharge oscillator device comprising a cathode, a periodic slow wave high Q anode structure including a plurality of resonator cavities surrounding said cathode, said cathode and said anode structure defining a reentrant slow wave structure effective for supporting a traveling wave mode of oscillation at a desired resonant operating frequency, only a single wave guide wrapped about said anode structure and including forward and reverse energy transmission ports at opposite ends thereof, directional coupling means between said anode structure and wave guide effective for directionally coupling energy from said slow wave structure toward only said forward port in said wave guide, said directional coupling means comprising a plurality of equally spaced coupling slots directly interconnecting said wave guide through a wall of every *n*th cavity of said anode structure, said slots being of a configuration and size effective to retain said high Q condition, the number of said cavities in said anode structure being an integral multiple of *n* and the positional relation of said coupling slots and said cavities being such that at said operating frequency the phase shift per cavity times *n* is other than an integral number of half wave lengths.

16. In combination, an electric discharge oscillator device comprising a cathode and a periodic slow wave high Q anode structure surrounding said cathode, said cathode and anode structure defining a reentrant slow wave structure effective for supporting a traveling wave mode of oscillation in said device at a desired resonant operating frequency, only a single transmission line concentric with said anode structure and including forward and reverse energy transmission ports at opposite and electrically separated ends thereof, energy transmission means coupled to said forward port and energy receiving means coupled to said reverse port, directional coupling means between said device and transmission line effective for directionally coupling energy preferentially toward said forward port and allowing reflected energy to be coupled back through said device and reverse port to said receiving means, said directional coupling means being effective to provide self-duplexing characteristics in said structure during periods of non-oscillation of said structure, said directional coupling means comprising a plurality of coupling connections equally symmetrically spaced completely about said slow wave structure and connecting each periodic section thereof with said transmission line, the number of coupling connections times the phase shift between adjacent coupling connections being equal to an integral number of wavelengths.

17. In combination, an electric discharge oscillator device comprising a cathode and a periodic slow wave high Q anode structure surrounding said cathode, said cathode and anode structure defining a reentrant slow wave structure effective for supporting a traveling wave mode of oscillation in said device at a desired resonant operating frequency, only a single transmission line concentric with said anode structure and including forward and reverse energy transmission ports at opposite electrically separated ends thereof, energy transmission means coupled to said forward port and energy receiving means coupled to said reverse port, directional coupling means between said device and transmission line effective for directionally coupling energy preferentially toward said forward port and allowing reflected energy to be coupled back through said device and reverse port to said receiving means, said directional coupling means comprising a plurality of coupling connections between said transmission line and periodic sections of said slow wave structure, said coupling connections being to every *n*th periodic section, the number of said periodic sections being an integral multiple of *n* and the positional relation of said coupling connections and said periodic sections being such that at said operating frequency the phase shift per periodic section times *n* is other than an integral number of half wave lengths.

18. In combination, an electric discharge oscillator device comprising a cathode and a periodic slow wave high Q anode structure surrounding said cathode, said cathode and anode structure defining a reentrant slow wave structure, effective for supporting a traveling wave mode of oscillation in said device at a desired resonant operating frequency, only a single transmission line concentric with said anode structure and including an output port at one end thereof, an output load coupled to said output port, a matched load restrictively located at and terminating the end of said transmission line opposite said output port, whereby any energy reflected from a mismatch in said output load is coupled back through said device and dissipated in said matched load, and directional coupling means between said device and transmission line effective for directionally coupling energy preferentially toward said output port and allowing reflected energy to be coupled back through said device to said matched load, said directional coupling means comprising a plurality of coupling connections equally spaced completely about said slow wave structure and connecting each periodic section thereof with said transmission line, the number of coupling connections times the phase shift between adjacent coupling connections being equal to an integral number of wavelengths.

19. In combination, an electric discharge oscillator device comprising a cathode and a periodic slow wave high Q anode structure surrounding said cathode, said cathode and anode structure defining a reentrant slow wave structure effective for supporting a traveling wave mode of oscillation in said device at a desired resonant operating frequency, only a single transmission line concentric with said anode structure and including an output port at one end thereof, an output load coupled to said output port, a matched load terminating the end of said transmission line opposite said output port, whereby any energy propagated toward said end of said transmission line opposite said output port is dissipated in said transmission line, directional coupling means between said device and transmission line effective for directionally coupling energy preferentially toward said forward port and allowing reflected energy to be coupled back through said device toward said matched load, said directional coupling means comprising a plurality of coupling connections between said transmission line and periodic sections of said slow wave structure, said coupling connections being to every *n*th periodic section, the number of said periodic sections being an integral multiple of $n$ and the positional relation of said coupling connections and said periodic sections being such that at said operating frequency the phase shift per periodic section times $n$ is other than an integral number of half wave lengths.

20. In combination, an electric discharge oscillator device comprising a cathode and a periodic slow wave high Q anode structure surrounding said cathode, said cathode and anode structure defining a reentrant slow wave structure effective for supporting a traveling wave mode of oscillation in said device at a desired resonant operating frequency, only a single transmission line concentric with said anode structure and including input and output ports at opposite electrically separated ends thereof, an output load coupled to said output port, directional coupling means between said device and transmission line effective for directionally coupling energy preferentially toward said output port, said directional coupling means comprising a plurality of symmetrical equally spaced coupling apertures equally spaced completely about said slow wave structure and directly connecting each periodic section thereof with said transmission line and effective to retain said high Q conditions, the number of coupling apertures times the phase shift between adjacent apertures being equal to an integral number of wavelengths, and a radio frequency signal source coupled to said input port effective for introducing signals through said input port and into said device for predeterminedly varying the oscillation of said device.

21. In combination, an electric discharge oscillator device comprising a cathode and a periodic slow wave high Q anode structure surrounding said cathode, said cathode and anode structure defining a reentrant slow wave structure effective for supporting a traveling wave mode of oscillation in said device at a desired operating frequency, only a single transmission line concentric with said anode structure and including input and output ports at opposite electrically separate ends thereof, said input and said output ports having a uniform impedance channel extending into said line and an output load coupled to said output port, directional coupling means between said device and transmission line effective for directionally coupling energy preferentially toward said output port, said directional coupling means comprising a plurality of symmetrical equally spaced coupling connections between said transmission line and periodic sections of said slow wave structure, said coupling connections being to every $n$th periodic section, the number of said periodic sections being an integral multiple of $n$ and the positional relation of said coupling connections and said periodic sections being such that at said operating frequency the phase shift per periodic section times $n$ is other than an integral number of half wave lengths, and a radio frequency signal source coupled to said input port effective for introducing signals through said input port and into said device for predeterminedly varying the oscillation of said device.

References Cited by the Examiner

UNITED STATES PATENTS

| | | | |
|---|---|---|---|
| 2,478,644 | 8/1949 | Spencer | 315—39.77 X |
| 2,481,151 | 9/1949 | Powers | 315—39 |
| 2,673,306 | 3/1954 | Brown | 315—40 |
| 2,715,697 | 8/1955 | Webber | 315—39.77 X |
| 2,760,111 | 8/1956 | Kumpfer | 315—3.5 X |
| 2,854,603 | 9/1958 | Collier et al. | 315—39.77 |
| 2,933,723 | 4/1960 | Brown | 315—39.3 X |
| 2,976,458 | 3/1961 | Feinstein | 315—39.77 |
| 3,032,680 | 5/1962 | Olson | 315—39.77 X |
| 3,034,014 | 5/1962 | Drexler | 315—39.77 |
| 3,082,351 | 3/1963 | Okress | 315—39.77 |
| 3,096,457 | 7/1963 | Smith et al. | 315—39.3 X |
| 3,113,239 | 12/1963 | Hass | 315—39.77 |

FOREIGN PATENTS

| | | |
|---|---|---|
| 750,021 | 6/1959 | Great Britain. |

ELI LIEBERMAN, *Acting Primary Examiner.*

ARTHUR GAUSS, GEORGE N. WESTBY, HERMAN KARL SAALBACH. *Examiners.*